_United States Patent Office_

2,807,539
Patented Sept. 24, 1957

2,807,539

PROCESS FOR REFINING TITANIUM

James Paterson Quin, Widnes, England, assignor to Imperial Chemical Industries Limited, a corporation of Great Britain No Drawing. Application April 7, 1952, Serial No. 281,037

Claims priority, application Great Britain October 29, 1951

4 Claims. (Cl. 75—84)

This invention relates to the purification of metals and more particularly to an improved process for the purification of titanium.

There are many difficulties associated with the separation of impurities from metallic titanium. When methods are employed in which the object is to extract the purities while leaving the substantially pure titanium unreacted it is found invariably that purification is incomplete. In particular impurities in the form of oxides or of oxygen in solution cannot be easily removed and these render the titanium hard and brittle. Such hard and brittle titanium cannot be used in most of the operations necessary to convert the metal to a form useful in industry.

Ronald Barron Mooney found and discloses in application Serial No. 323,709, filed December 2, 1952, that titanium metal containing oxygen may be purified with a consequent reduction in the hardness of the metal in a surprisingly convenient manner by treating the titanium with calcium at a temperature not less than 900° C.

It is also disclosed that to secure adequate operation of the process, the amount of calcium used must be greater than that chemically equivalent to the impurity initially present.

The above referred to disclosure also states that in the operation of the process the calcium may be used either molten or in the gaseous state. To obtain the best result and particularly if it is desired that substantially pure titanium be obtained, the calcium itself should be as free as possible from objectionable impurities. The presence of nitrogen in the calcium is particularly objectionable even though it does not prevent the removal of oxygen from the titanium. It is, therefore, disclosed to be desirable for all practical purposes to ensure that the total amount of nitrogen in the calcium used in the process is at a minimum. The above referred to disclosure concludes that a satisfactory titanium product can be obtained when employing calcium containing up to 0.05% by weight of nitrogen.

According to a further feature of the above referred to disclosure, there may be used as an alternative to elemental calcium, calcium hydride free from nitride contamination or calcium in the presence of hydrogen at approximately 1000° C. will be equally effective. Any hydrogen which may be absorbed by the titanium during such treatment can easily be removed by subsequently heating the metal in a vacuum.

I have found that the treatment of metallic titanium with calcium to remove the deleterious effect due to the presence of oxygen is very conveniently and economically carried out in a fluid medium containing the calcium. A suitable medium for the treatment may be another molten metal which does not alloy with titanium and in which calcium is soluble as for example, an alkali metal or another alkaline earth metal or mixtures of these. I have found that particularly suitable metals are the metals sodium, potassium, lithium, magnesium, strontium and barium.

According to another feature of this invention, it was found that it is especially economical and convenient from many aspects to employ the calcium in solution in a molten metal halide such as, for example, the halides of the alkali or alkaline earth metals. Particularly suitable halides are the chlorides and it is advantageous to use calcium chloride. Anhydrous calcium chloride may be given an appropriate calcium content for the purposes of the invention by the addition of metallic calcium. Alternatively, another suitable metal such as sodium, potassium or lithium may be added to react with the calcium chloride and thereby provide a metallic calcium content in the molten calcium chloride bath. The addition of these alkali metals to molten halides has a particular advantage also in that it provides convenient means for the removal of the last traces of water. In the presence of a large excess of calcium chloride there is obtained a calcium-sodium alloy as metal phase which is particularly rich in calcium, but at the preferred temperature of operation, however, there is a tendency for the sodium to distil out of the melt and hence it is desirable in order to prevent loss of sodium to provide a reflux condenser while treatment is in progress.

In a preferred embodiment of this form of the present invention a direct electric current is applied by appropriate known means to molten calcium chloride, whereby calcium and chlorine are liberated, and the titanium to be purified is immersed in the bath. The electrolysis of the melt produces the calcium which remains in solution in the molten calcium chloride and chlorine which is removed by a suitable ducting arrangement. This method has the particular advantage in that it provides means whereby a treatment bath may be maintained continuously at any desired and predetermined concentration of calcium.

The above referred to application of Ronald Barron Mooney also discloses that to avoid the deleterious effects which, as is known, result from the presence of oxygen and nitrogen, it is advantageous to treat the titanium in an inert atmosphere, in hydrogen or in vacuo.

It is disclosed in the above referred to Mooney application that helium or argon are conveniently employed to provide the inert atmosphere but that even then care should be taken to ensure that these gases are as free as possible from nitrogen. Commercial argon on account of its relatively high nitrogen content is not recommended but this gas may conveniently be employed after the removal of nitrogen and moisture by any of the well known methods of purification. Although complete removal of nitrogen from the argon used as an inert atmosphere is desirable this may be difficult in commercial operation. It is therefore disclosed to be desirable to state that satisfactory purification of titanium may be obtained when using an argon atmosphere containing 0.05% by volume of nitrogen.

The temperature of the treatment is disclosed in the said Mooney application to be variable within fairly wide limits although it is most convenient to work in the neighbourhood of 1000° C. The said Mooney application further discloses that efficient treatment may be carried out both with higher and lower temperature, but that in whatever form the calcium is applied it is necessary for all practical purposes to operate at temperatures in excess of 900° C. The time of treatment is disclosed to be dependent to a large extent upon the temperature, that is to say, that the lower the temperature the longer the treatment, and that in order that treatment may be completed in a reasonable period it is preferred to operate at temperatures between 950 and 1250° C. Other factors disclosed to affect the time for completing the treatment are the degree of contamination of the metallic titanium and also the size of the individual piece of metal undergoing treatment. In the case of strip metal a few millimetres thick it is disclosed that good results are obtainable by treating the strips for 3 to 4 hours at temperatures in the neighbourhood of 950 to 1050° C. With a material of greater thickness with the oxygen contamination uniformly present in the metal it is disclosed that appreciably longer times of treatment are necessary. When the oxygen impurity is present only in the surface layer of massive titanium, it is disclosed that the time of treatment will in general correspond to that used in the treatment of strip material. It is disclosed, for example, that when the oxygen is present in a surface layer 0.5 mm. thick the time of treatment will be similar to that necessary for the treatment of strip material approximately 0.5 mm. thick.

I have found that the same temperatures, times and other operational conditions of treatment as disclosed in the said Mooney application are applicable to the present development.

Following the treatment of the titanium in a molten bath containing calcium the purified product may be removed from the bath and allowed to cool in an inert atmosphere, after which any of the bath contents carried out by the metal may be removed by an appropriate means depending upon the precise composition of the bath, and when calcium chloride is used a thorough cleansing with dilute acid, e. g. hydrochloric acid followed by washing with water has been found satisfactory.

As indicated in the said mooney application the titanium metal to be treated by the method of the invention may be in a variety of physical forms. When the oxygen is uniformly present throughout the titanium it is preferably in the form of strip, granules or powder of which at least one dimension of the individual pieces or particles is less than 5 mm. and advantageously less than 1 mm.

It is also disclosed that although impure titanium in the form of strips may be purified to some extent by treatment for a period of 15 minutes effective purification usually requires several hours. It is further disclosed that after treatment the titanium is allowed to cool in an inert atmosphere similar to that used during the purification, and that adhering calcium is removed as completely as possible by mechanical means such as scraping. Any remaining, is then removed by immersion in dilute hydrochloric acid followed by a water wash. As the calcium reacts to liberate hydrogen, care should be taken at this stage to avoid overheating of the titanium and absorption of hydrogen therein. The above referred to Mooney application teaches that one method of avoiding undue temperature rise is to use large volumes of dilute acid and water.

The following examples illustrate but do not limit my invention:

*Example 1*

Strips of metallic titanium 1 mm. thick were immersed in a bath containing a fused mixture of 5 parts by weight of calcium and 95 parts by weight of anhydrous calcium chloride in an atmosphere of purified argon. The bath was maintained at a temperature of 1000° and the titanium strips were allowed to remain immersed for a period of 3 hours. The strips were then removed from the bath and allowed to cool in the same argon atmosphere as before. They were then washed in 5% hydrochloric acid and water and then dried.

Comparative figures for oxygen content of the titanium strips before and after treatment were as follows:

|  | Oxygen content, percent weight | V. H. N., 10 kg. load | | |
|---|---|---|---|---|
|  |  | Max. | Min. | Mean |
| Before treatment | 0.7 | 331 | 294 | 313 |
| After treatment | 0.2 | 172 | 169 | 171 |

*Example 2*

In a bath of molten calcium chloride containing 5% by weight of calcium strips of titanium of dimensions ⅛″ x 3″ x 6″ were immersed by placing the strips in a titanium basket. The bath was maintained at an average temperature of 960° C. Under an atmosphere of purified argon and the strips remained immersed for a period of 7 hours. After this treatment the basket containing the titanium strips was removed and the strips allowed to cool in an atmosphere of purified argon. Calcium chloride adhering to the cooled strips was removed by washing in dilute hydrochloric acid and water and the strips were then allowed to dry. It was found that the oxygen content had been reduced from 0.49% to 0.25% in one case and from 0.28% to 0.07% in a second.

*Example 3*

Small pieces of titanium turnings about ¼″ to 1″ long by about ¹⁄₁₆″ which had first been treated to remove grease were immersed in the same bath as described in Example 2 and the temperature maintained at 960°. After 4 hours of treatment under these conditions it was found that the oxygen content of the sample had been reduced from 0.44% to 0.07%. A similar experiment carried out for 2 hours reduced the oxygen from 0.29% to 0.14%.

I claim:

1. A process for the purification of titanium in massive form containing oxygen which comprises treating the titanium at a temperature of at least 900° C., with calcium dissolved in a liquid medium selected from the group consisting of molten strontium, barium, magnesium, alkali metals, alkali metal halides and alkaline earth metal halides, the amount of calcium utilized being in excess of that chemically equivalent to the oxygen present in said titanium, removing the said titanium from said calcium-containing liquid medium and then removing adhering material from the surfaces of the titanium.

2. A process as recited in claim 1 in which the said treatment is performed at a temperature in the range of from 950° to 1250° C.

3. A process as recited in claim 1 in which the said liquid medium comprises anhydrous calcium chloride.

4. A process as recited in claim 3 in which the calcium is provided by adding an alkali metal to the said anhydrous calcium chloride.

References Cited in the file of this patent

UNITED STATES PATENTS

| 2,148,345 | Freudenberg | Feb. 21, 1939 |
| 2,205,854 | Kroll | June 25, 1940 |
| 2,287,771 | Alexander | June 30, 1942 |
| 2,427,338 | Alexander | Sept. 16, 1943 |
| 2,546,320 | Rostron | Mar. 27, 1951 |
| 2,607,674 | Winter | Aug. 19, 1952 |
| 2,707,679 | Lilliendahl et al. | May 3, 1955 |

FOREIGN PATENTS

| 13,759 | Great Britain | 1904 |